United States Patent [19]

Fink

[11] Patent Number: 4,508,582

[45] Date of Patent: Apr. 2, 1985

[54] PROCESS FOR JOINING POLYURETHANE COATED FABRICS

[75] Inventor: Hans Fink, Möhlin, Switzerland

[73] Assignee: Bata Schuh AG., Möhlin, Switzerland

[21] Appl. No.: 577,024

[22] Filed: Feb. 6, 1984

[51] Int. Cl.³ .......................... B32B 31/16; B32B 7/08
[52] U.S. Cl. ................. 156/93; 12/146 CK; 36/45; 156/227; 156/275.1; 428/104
[58] Field of Search ............ 12/142 A, 142 C, 142 D, 12/146 CK; 36/16, 17 A, 17 PW, 17 R, 19 A, 21, 45, 47, 87; 156/93, 222, 227, 304.4, 292, 308.4, 275.1; 428/104

[56] References Cited

U.S. PATENT DOCUMENTS

| | | | |
|---|---|---|---|
| 3,591,881 | 7/1971 | White et al. | 12/146 C |
| 3,625,790 | 12/1971 | Ayres | 156/93 |
| 3,643,271 | 2/1972 | Wilkinson | 12/146 C |
| 3,686,064 | 8/1972 | Bonnet et al. | 156/93 X |
| 4,247,345 | 1/1981 | Kadija et al. | 156/93 X |

FOREIGN PATENT DOCUMENTS 436774 10/1935 United Kingdom .
977367 12/1964 United Kingdom .

Primary Examiner—Robert Dawson
Attorney, Agent, or Firm—Walter C. Farley

[57] ABSTRACT

A process for forming a strong, pressure-tight joint between fabric substrates includes coating each substrate with polyurethane on one side, superimposing the fabric substrates so that the polyurethane layers are together, welding elongated regions of the polyurethane together under heat and pressure and sewing through the weld. The edge is then folded over and bonded to itself and the material is spread out. The resulting material can be bonded to a sole to form a waterproof, lightweight boot.

2 Claims, 5 Drawing Figures

PROCESS FOR JOINING POLYURETHANE COATED FABRICS

SPECIFICATION

This invention relates to a process for forming a pressure-tight and tension-proof joint between sheets or substrates of fabric coated with polyurethane, and also to the use of this method for forming shoes.

BACKGROUND OF THE INVENTION

British Pat. No. 436,774 (Greenside and Irwell Rubber Co., Ltd., 1935) describes and claims a process for tightly sewing together fabric webs. The webs are bonded together at the edges externally and at the same side, spread apart, externally sewn at the edge in the adhesive layer, the edge with the layer then being wrapped around and bonded to an outer face of the web. Thus, on one side of the seam, the stitches are located in the adhesive which should lead to a waterproof joint. Any tensile stress to which the joint is subjected is exclusively taken up by the bond and the sewn seam does not contribute in any way to the tensile strength of the joint. Pressure tightness is neither sought nor obtained in the process described in this British patent. Furthermore, one side of the seam always comes to rest at the top and must therefore be separately bonded over as, otherwise, there would be a risk of the threads ripping open.

British Pat. No. 977,367 (The Coventry Hood and Side Screen Co., Ltd., 1964) relates to a process for joining fabric webs which are coated on both sides in a waterproof manner.

As a result, it is possible to (a) arrange the webs in a flush manner one above the other, (b) sew them together at the edge, (c) fold the upper web over the seam, and (d) seal the plastic coating in the seam area.

With this process, the resulting seam exhibits considerable unevenness, both on the inside and the outside, which is particularly unacceptable if the joined fabrics are to be used in making shoes. Additionally, this process is based on the use of fabric which is coated on both sides, such fabric not being suitable for use in articles of clothing or shoes. Still further, the seam is unable to withstand tensile stresses.

The above described process using fabric which is coated on one side, according to FIGS. 1 and 2 of the first-mentioned British patent, leads to unsound and less strong joints. The description thereof makes no reference to the degree of pressure tightness of the joint.

It is possible to use a conventional method of joining polyurethane coated fabric materials by sewing and to them provide the seam with an adhesive strip. However, this type of joining such materials is never tight, not even against water acting with little or no pressure, e.g., rain or puddles. Without such adhesive tape, the water passes through the seam holes and with an adhesive tape the water which has entered through the seam holes diffuses relatively rapidly between the adhesive tape and the inside of the fabric material.

BRIEF SUMMARY OF THE INVENTION

Accordingly, an object of the present invention is to provide a seam which can adequately resist water under pressure and which can also withstand substantial tension forces.

Briefly described, the invention includes a process for forming a pressure-tight and tension-proof joint between fabric substrates comprising coating one side of each substrate with a layer of polyurethane and placing the substrates adjacent each other with the polyurethane layers facing each other and together. Pressure is then applied to a selected region near an edge of the adjacent fabric substrates and inductive heating is used to elevate the temperature of the selected region so that the polyurethane material in the selected region is welded together. A seam is then sewn along the selected region so that the stitching passes through the weld formed by the heat and pressure. The portion of the material of the welded substrate is then folded over along the welded region and adhered so that a portion of one of the substrates along the selected edge lies against and is bonded to itself. Finally, the remaining portions of the substrates are separated from each other and spread out, forming a sheet having the water-tight and force-resistant joint extending across a midportion thereof.

The material thus formed can then be used to form a shoe, using this material as the upper, the subsequent processing of the upper being accomplished in the absence of solvents and elevated temperatures.

BRIEF DESCRIPTION OF THE DRAWINGS

In order that the manner in which the above and other objects are attained in accordance with the invention can be understood in detail, a particularly advantageous example thereof will be described with reference to the accompanying drawings which form a part of this specification and in which.

DESCRIPTION OF THE PREFERRED EMBODIMENT

The invention will be described in the context of forming uppers for ladies' boots which are stamped out of a polyurethane-coated fabric, that is to say, polyurethane coagulated onto a substrate or base. In each case, there are two webs each superimposed with the polyurethane layer.

Figure 1:
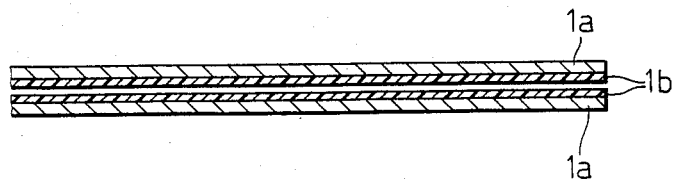
FIGS. 1–5 show the sequential steps by which a joint is formed in accordance with the invention.
Figure 2:
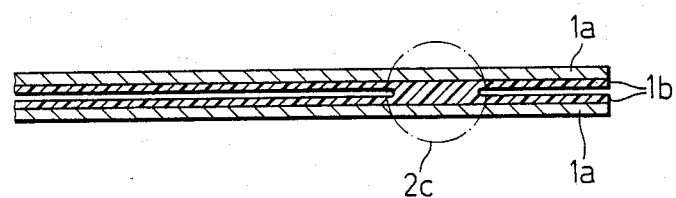

Thus, the uppers are made from two superimposed parts which are substantially identical to each other, although there can be differences in shape. As shown in FIG. 1, each of the webs includes a fabric layer $1a$ having superimposed thereon a substantially coextensive polyurethane layer $1b$. These are placed together and a welding frame of a conventional type, not shown, is placed against the adjacent webs so as to apply pressure to a selected region $2c$ which is significantly closer to one edge of the structure than to another. While applying this pressure, the selected region $2c$ is heated, preferably by an inductive heating technique, so that a bonded or welded region is formed, this region being approximately 3 mm. in width in the example shown. It will be observed that only the polyurethane in this strip, which extends perpendicular to the plane of the drawing and is 3 mm. in width, is joined, the remaining portions of the polyurethane being separable. The weld center is preferably about 5 mm. from the closest edge.

Figure 3:
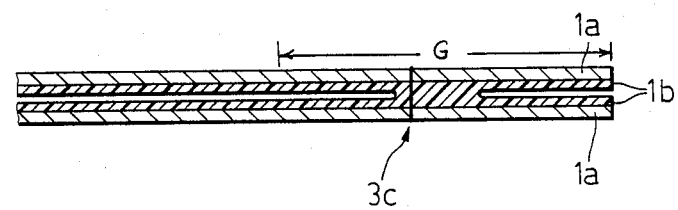

As then shown in FIG. 3, a sewn seam is then formed along the weld so that the stitches $3c$ of the seam pass through the welded material as well as through the fabric layers $1a$. The seam extends along the entire weld and is positioned between the inner edge of the weld and the center line thereof.

Figure 4:
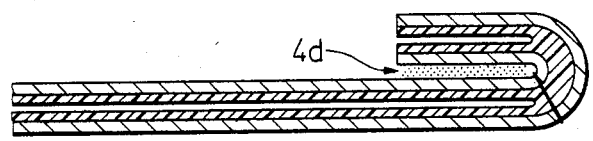
Figure 5:
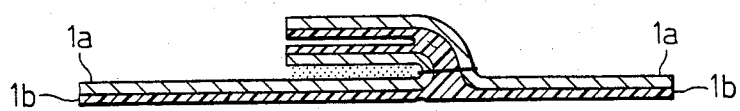

A conventional adhesive is then applied along the edge to one exposed surface of one of the layers of fabric 1a, the adhesive occupying a region indicated approximately at G in FIG. 3, extending from the edge closest to the weld inwardly beyond the welded and sewn seam. The edge is then folded over, as illustrated in FIG. 4, with the adhesive 4d within the fold so that a portion of the top one of the substrates lies against itself along the selected edge and is bonded or adhered to itself. Finally, the opposite edge is opened up as illustrated in FIG. 5, the fabric layers being separated and spread out so that the result is a sheet of material having the welded and sewn seam extending across an intermediate portion thereof with the lower surface comprising a continuous, uninterrupted layer of thermoformable polyurethane, the stitching being in a plane which is generally parallel to this lower surface when positioned in the flat arrangement as shown in FIG. 5 so as to be capable of absorbing tension forces.

The resulting structure can then be inverted and used as an upper to form a boot with a bonded-on sole without using heat or solvents. The result is a ladies' boot which, because of the materials used, is lightweight and has an attractive appearance but which is capable of withstanding the leakage test of the type used for working boots made from extruded synthetic rubber, subjected to a pressure test of two atmospheres. As will be understood, elevated temperatures are to be avoided in this processing, at least those temperatures which approach the softening point of the polyurethane layer 1b.

As will be recognized, sewn and/or bonded materials produced in accordance with the prior art techniques, the above-mentioned leakage test immediately leads to the passage of air through such joints.

While one advantageous embodiment has been chosen to illustrate the invention, it will be understood by those skilled in the art that various changes and modifications can be made therein without departing from the scope of the invention as defined in the appended claims.

What is claimed is:

1. A process for forming a pressure-tight and tension-proof joint between fabric substrate comprising the steps of
    coating one side of each substrate with a layer of polyurethane,
    placing the substrates adjacent each other with the polyurethane layers together,
    applying pressure to a selected region near an edge of the adjacent fabric substrates and inductively heating the selected region so that the polyurethane material in the selected region is welded together,
    sewing a seam along the region so that the stitching passes through the weld thus formed,
    folding over and adhering the material of the welded substrates along the welded region so that a portion of one of the substrates along the selected edge lies against and is bonded to itself, and
    separating and spreading out the remainder of the coated fabric substrates.

2. A method of forming a shoe including forming an upper in accordance with Claim 1 and bonding the upper to a sole, the subsequent processing including the upper being accomplished in the absence of solvents and elevated temperatures.

* * * * *